April 14, 1931.  H. C. WASSON  1,800,236
VEHICLE
Filed April 20, 1929   2 Sheets-Sheet 1

INVENTOR.
Harry C. Wasson
BY
Ira L. Nickerson
ATTORNEY.

Patented Apr. 14, 1931

1,800,236

UNITED STATES PATENT OFFICE

HARRY C. WASSON, OF FRANKLIN, PENNSYLVANIA, ASSIGNOR TO CHICAGO PNEUMATIC TOOL COMPANY, OF NEW YORK, N. Y., A CORPORATION OF NEW JERSEY

VEHICLE

Application filed April 20, 1929. Serial No. 356,649.

This invention relates to the transportation of machinery with particular reference to portable power plants, such as self-contained power-driven compressors.

One object of the invention is to adapt a power plant for wheeled passage either on a trackway requiring flanged wheels or on an ordinary roadway requiring flat faced wheels. Another object is to provide apparatus for making the change with a minimum of effort and loss of time. Other objects will be apparent from the detailed description which follows.

In order to illustrate the invention one concrete embodiment thereof is shown in the accompanying drawings, in which.

Figure 1:
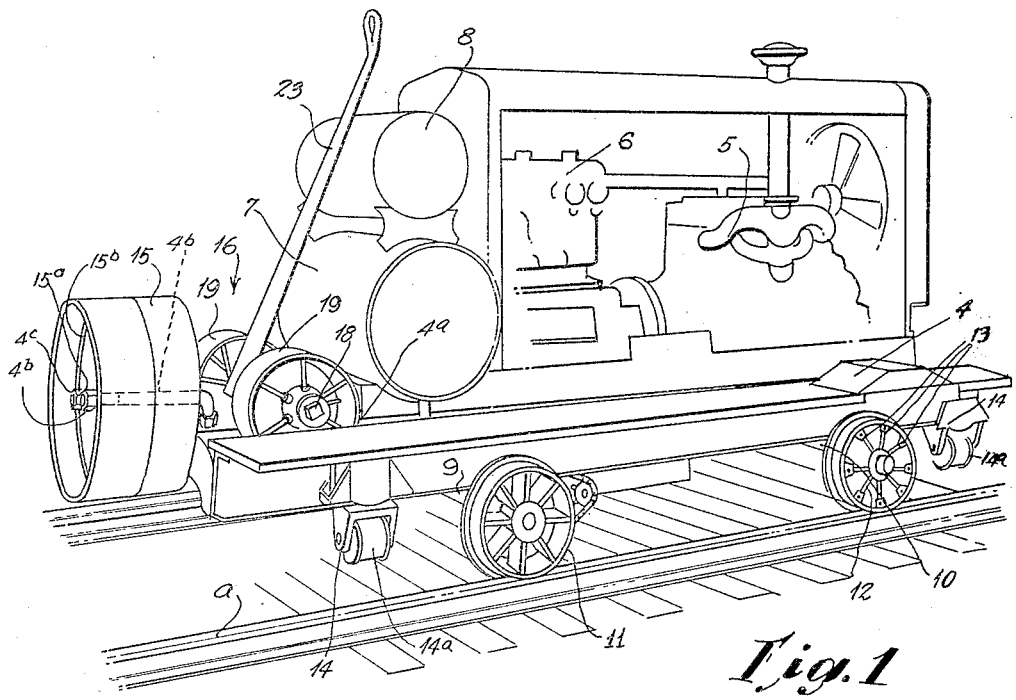
Fig. 1 is a perspective view of a vehicle arranged for travel on a railway.
Figure 2:
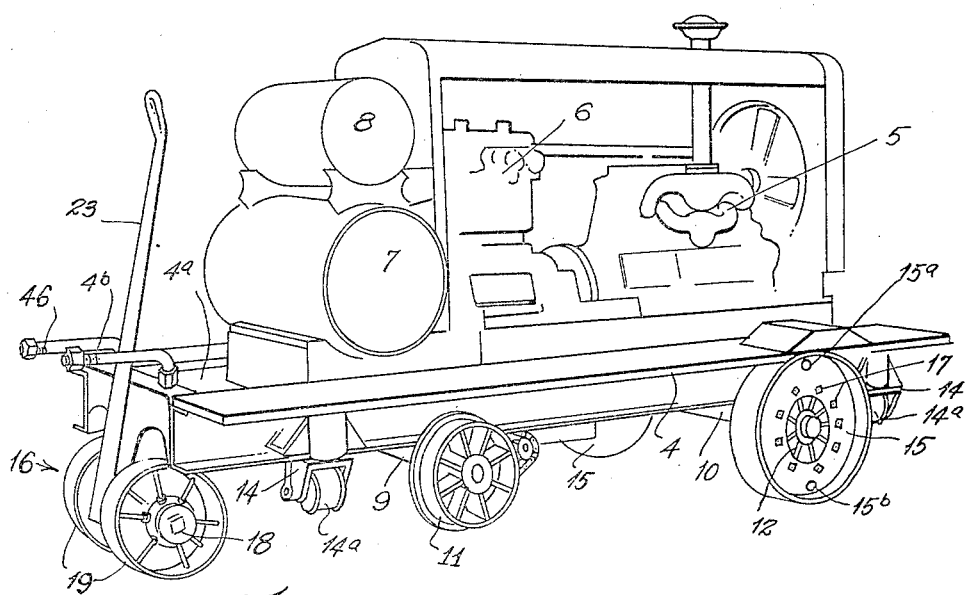
Fig. 2 is a perspective view of the same vehicle arranged for land or highway use.

In the embodiment of the invention chosen for the purpose of illustration, the vehicle comprises a portable frame 4 upon which is mounted certain power machinery, in the present instance, an internal combustion engine 5 arranged to drive an air compressor 6. Rearwardly of the engine unit and in superposition are the air receiver tank 7 and fuel tank 8. Since the particular machinery and power apparatus forms no part of the present invention further description thereof is omitted.

Beneath and supporting frame 4 is a power shaft or axle 9 which carries flanged wheels 11 to fit rails $a$ and in spaced relation thereto is a shaft or axle 10 carrying somewhat similar flanged wheels 12 which are provided with an annular series of threaded holes 13 for apparatus presently to be described. The lower portion of the frame also provides jacks 14 having wheels or rollers 14$a$ transversely arranged for elevating the vehicle either to move it off the right of way or to permit the application of apparatus for moving the vehicle over highways or upon a non-rigid supporting surface. Jacks 14 may be arranged either for manual or power operation but those shown are actuated by compressed air from receiver 7 and conform in structure and in operation substantially to those described and claimed in U. S. Patent No. 1,444,115.

The apparatus for adapting the vehicle for movement on other than rail surfaces comprises large disc wheels 15 having broad flat faces or tires and a dirigible truck or axle assembly 16. This apparatus is arranged to be supported when not in use on the frame of the vehicle at one end thereof as clearly indicated in Fig. 1, the dirigible axle assembly 16 being received in a recess or well 4$a$ on the vehicle frame. The road wheels 15 have perforations 15$a$ to receive rods or hangers 4$b$ projecting beyond the right end of frame 4, the wheels being held in place by suitable securing members such as nuts 4$c$.

Figure 3:
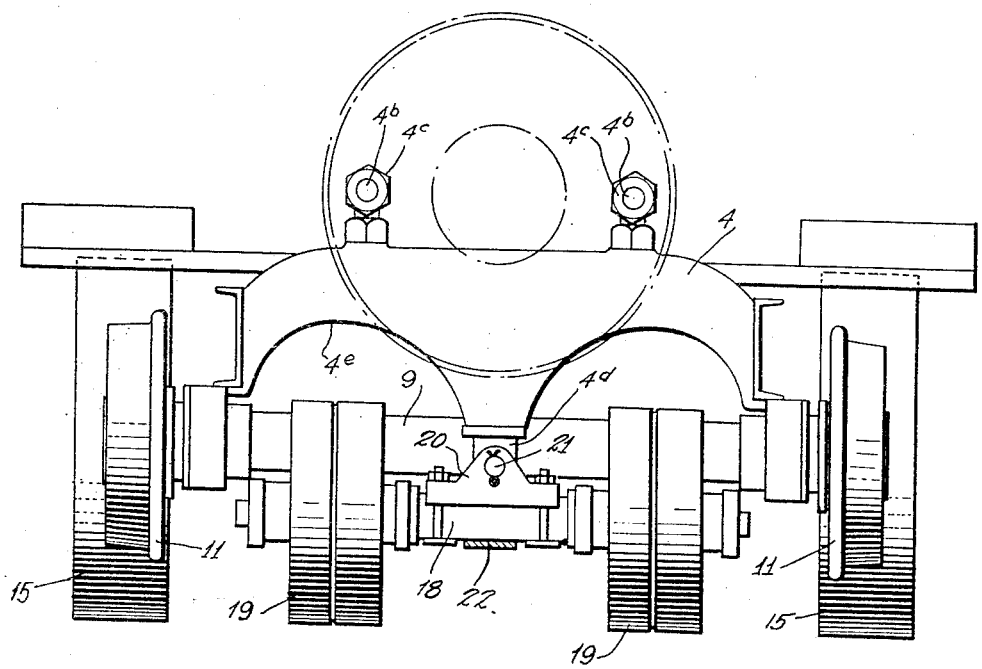
Fig. 3 is a fragmentary and somewhat diagrammatic front end elevational view of the lower portion of the vehicle when arranged for highway use.

Road wheels 15 are secured directly to flanged wheels 12 on fixed shaft 10 by a series of screw bolts 17 which cooperate with the threaded holes 13 in wheels 12. Axle assembly 16 is arranged to support the vehicle frame at the right end of the same and to hold the vehicle in elevated position so that flanged wheels 9 have no contact with the highway, as clearly indicated in Fig. 3. The axle assembly comprises essentially an axle 18 having road wheels 19 of smaller size than wheels 15 but with similar broad flat faces or tires. Secured to the upper side of axle 18 is a bracket 20 which is adapted to be secured by a suitable member such as a pin 21 to a pivot member or projection 4$d$ on the vehicle frame. The frame on either side of pivot projection 4$b$ is hollowed out or otherwise shaped as indicated at 4$e$ to permit swinging movement of axle assembly 16 in directing or turning the vehicle. A plate 22 secured to the under side of axle 18 provides for the attachment of a draw bar 23.

From the above it will be apparent that the present invention provides for the quick and convenient adaptation of a rail vehicle to dirigible movement upon the land, that the apparatus for such adaptation is simple, inexpensive and easy to apply and to remove without changing the elements necessary for operation of the vehicle on rails, and that the road apparatus may be conveniently supported upon the vehicle frame when not in use without interference with the power apparatus or machinery supported thereon.

While the invention has been herein disclosed in what is now considered to be a preferred form, it is to be understood that the invention is not limited to the specific details thereof, but covers all changes, modifications, and adaptations within the scope of the appended claims.

I claim as my invention:

1. A vehicle having spaced axles having flanged wheels for use on rails, and means for adapting said vehicle for dirigible highway travel including an axle removably secured to said vehicle for pivotal movement thereon and road wheels on said last-named axle.

2. A vehicle having spaced axles having flanged wheels for use on rails, and means for adapting said vehicle for dirigible highway travel, including larger wheels having flat faces removably secured to the flanged wheels on one of said axles, and an axle for pivotal attachment to said vehicle and having road wheels thereon and a draw bar secured thereto.

3. A vehicle having spaced axles having flanged wheels for use on rails, and means mounted on said vehicle for adapting the same to dirigible land travel including larger wheels having flat faces for attachment to the flanged wheels of one of said axles and a dirigible road wheel axle assembly for pivotal attachment to said vehicle to render the flanged wheels on the other of said axles inoperative.

4. A vehicle having spaced axles having flanged wheels for use on rails, and means mounted on said vehicle at one end thereof for adapting the same to dirigible land travel, a pivot on said end of said vehicle, said means including an axle with road wheels arranged to be removably secured to said pivot for steering said vehicle.

5. A vehicle having spaced axles having flanged wheels for use on rails, and means for adapting said vehicle for dirigible highway travel including larger wheels having flat faces removably secured to the flanged wheels on one of said axles and an axle for pivotal attachment to said vehicle and having road wheels thereon and a draw bar secured thereto, said vehicle having means at one end for supporting said land apparatus when said vehicle is used for rail travel.

6. A vehicle having spaced axles provided with flanged wheels for use on rails, and means for adapting said vehicle for dirigible highway travel including an axle assembly arranged to be removably secured to said vehicle for pivotal movement thereon and having road wheels, said vehicle having a recess to receive said road wheel axle assembly when not in use.

7. A vehicle having a frame supported by axles provided with flanged wheels for use on rails, and means for adapting said vehicle for dirigible highway travel including larger wheels with flat faces removably secured to the flanged wheels on one of said axles, said vehicle having rods projecting therefrom arranged to extend through perforations in said larger wheels for carrying the same when not in use.

8. A vehicle having a frame supported by axles provided with flanged wheels for use on rails, and means for adapting said vehicle for dirigible highway travel including larger wheels with flat faces removably secured to the flanged wheels on one of said axles, and an axle for pivotal attachment to said vehicle and having road wheels thereon, and a draw bar secured thereto, said vehicle having a recess to receive said road wheel assembly and projecting rods arranged to extend through perforations in said larger wheels for supporting said means when not in use.

9. A portable power driven compressor mounted on a frame provided with fixed transverse axles, flanged wheels on said axles to permit movement of said compressor on rails, means for raising said compressor off said wheels, and means applicable to said compressor when raised for adapting the same to land travel including an axle assembly for pivotal mounting on said frame and road wheels on said assembly.

10. A portable power driven compressor mounted on a frame provided with fixed transverse axles, flanged wheels on said axles to permit movement of said compressor on rails, means for raising said compressor off said wheels, and means applicable to said compressor when raised for adapting the same to land travel including wheels with flat tires secured to the flanged wheels on one of said axles, a relatively narrow axle assembly for pivotal connection with the frame of said vehicle at one end thereof to steer the vehicle on land and road wheels on said assembly.

11. A portable power driven compressor mounted on a frame provided with fixed transverse axles, flanged wheels on said axles to permit movement of said compressor on rails, means for raising said compressor off said wheels, and means applicable to said compressor when raised for adapting the same to land travel including wheels with flat tires secured to the flanged wheels on one of said axles, a relatively narrow axle assembly for pivotal connection with the frame of said vehicle at one end thereof to steer the vehicle on land, road wheels on said assembly, and means on said frame for carrying said land travel means when not in use.

12. A portable power driven compressor mounted on a frame provided with fixed transverse axles, flanged wheels on said axles to permit movement of said compressor on rails, means for raising said compressor off said wheels, and means applicable to said compressor when raised for adapting the same to land travel including large wheels with flat tires secured to the flanged wheels on one of said axles, a relatively narrow axle assembly provided with road wheels, means for pivotally mounting said axle assembly on the frame of said compressor at one end thereof to steer the same on land, and means on said compressor for carrying said land travel means when not in use including a recess in said frame for said assembly and at least one rod projecting from said frame and arranged to extend through an opening in each of said large wheels.

Signed by me at Franklin, in the county of Venango and State of Pennsylvania, this 18th day of April, 1929.

HARRY C. WASSON.